United States Patent [19]
Cunningham et al.

[11] Patent Number: 5,443,286
[45] Date of Patent: * Aug. 22, 1995

[54] GAS GENERATOR FOR VEHICLE OCCUPANT RESTRAINT SYSTEM

[75] Inventors: Donald J. Cunningham, North Ogden; James D. Erickson, Ogden, both of Utah

[73] Assignee: Morton International, Inc., Chicago, Ill.

[*] Notice: The portion of the term of this patent subsequent to Apr. 25, 2012 has been disclaimed.

[21] Appl. No.: 106,291

[22] Filed: Aug. 13, 1993

Related U.S. Application Data

[63] Continuation-in-part of Ser. No. 958,934, Oct. 9, 1992, pending.

[51] Int. Cl.$^6$ ............................................. B60R 21/26
[52] U.S. Cl. .................................... 280/741; 102/531
[58] Field of Search ............... 280/736, 741; 102/530, 102/531, 202.5; 60/256; 422/164, 165, 166

[56] References Cited

U.S. PATENT DOCUMENTS

| | | | |
|---|---|---|---|
| 2,440,241 | 4/1948 | Hickman | 60/256 |
| 3,723,205 | 3/1973 | Scheffee | 280/741 |
| 3,773,351 | 11/1973 | Catanzarite | 280/150 AB |
| 3,985,076 | 10/1976 | Schneiter | 280/741 |
| 4,158,696 | 6/1979 | Wilhelm | 422/164 |
| 4,296,084 | 10/1981 | Adams et al. | 423/351 |
| 4,370,930 | 2/1983 | Strasser et al. | 102/530 |
| 4,394,033 | 7/1983 | Goetz et al. | 280/736 |
| 4,561,675 | 12/1985 | Adams | 280/741 |
| 4,833,996 | 5/1989 | Hayashi et al. | 102/530 |
| 4,858,951 | 8/1989 | Lenzen | 280/741 |
| 4,919,897 | 4/1990 | Bender et al. | 422/165 |
| 4,950,458 | 8/1990 | Cunningham | 422/164 |
| 4,998,751 | 3/1991 | Paxton et al. | 280/741 |
| 5,000,479 | 3/1991 | Werner et al. | 280/741 |
| 5,048,862 | 9/1991 | Bender et al. | 280/736 |
| 5,062,367 | 11/1991 | Hayashi et al. | 280/741 |
| 5,100,170 | 3/1992 | Mihm et al. | 280/735 |
| 5,100,174 | 3/1992 | Jasken et al. | 280/741 |
| 5,253,895 | 10/1993 | Bretfeld | 280/741 |
| 5,259,644 | 11/1993 | Albrecht et al. | 280/741 |

FOREIGN PATENT DOCUMENTS

| | | |
|---|---|---|
| 0589152 | 3/1994 | European Pat. Off. |
| 4229624 | 3/1993 | Germany .................. B60R 21/26 |

OTHER PUBLICATIONS

Search Report of Feb. 3, 1994 in EP Application No. 93308051.7.

Primary Examiner—Karin L. Tyson
Attorney, Agent, or Firm—George W. Rauchfuss, Jr.; Gerald K. White

[57] ABSTRACT

A gas generator for vehicle occupant restraint systems comprises an elongated housing having gas outlet openings, a sealed, rupturable gas generant cartridge positioned within the housing, and pyrotechnic gas generant contained in the cartridge in the form of a plurality of wafers having openings defining a central passage. An igniter capsule mounted at one end of the housing has an exit opening juxtaposed the sealed gas generant cartridge and the central passage of the gas generant therein. The igniter capsule contains ignitor material, and an initiator and initiator charge. The initiator ignites the ignitor material which expels a fireball of hot combustion products from the capsules exit opening, rupturing the sealed cartridge and igniting the gas generant charge to produce gas for inflating an air bag. A rupturable seal is provided over the exit opening of the ignitor capsule and a nozzle directs hot combustion products to the gas generant cartridge. The initiator charge is auto ignitor material for operating the gas generator if it is exposed to fire. The ignitor capsule comprises overlapping metal parts, and is mounted as a closure of the elongated housing. The gas generant cartridge is placed in the housing surrounded by filtering and cooling screens. One end of the rupturable gas generant cartridge adjacent the ignitor capsule outlet is scored for rupturing inwardly to admit the ignitor fireball. The cartridge contains wraps of filter screen to provide structural rigidity, and additional filter and cooling materials surround the cartridge.

42 Claims, 3 Drawing Sheets

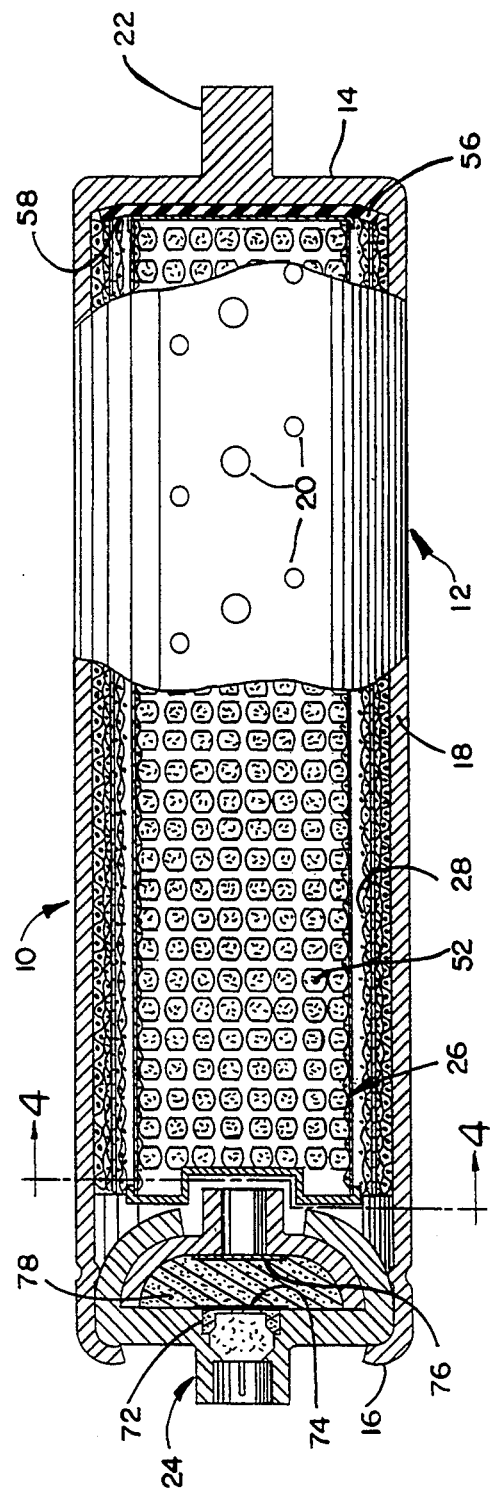
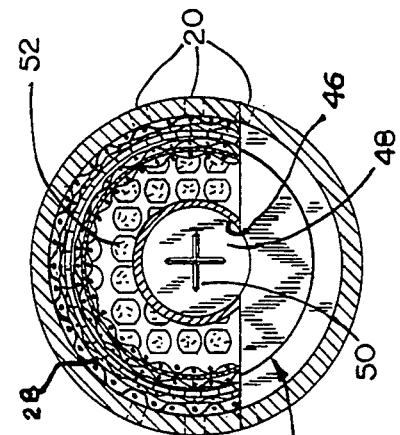
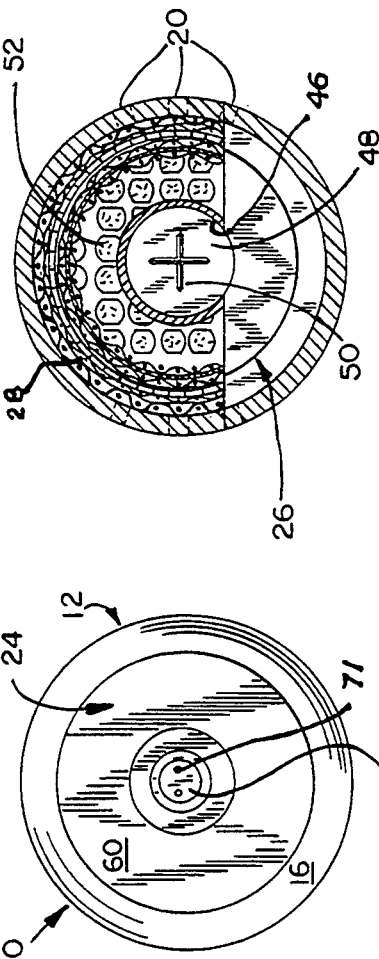
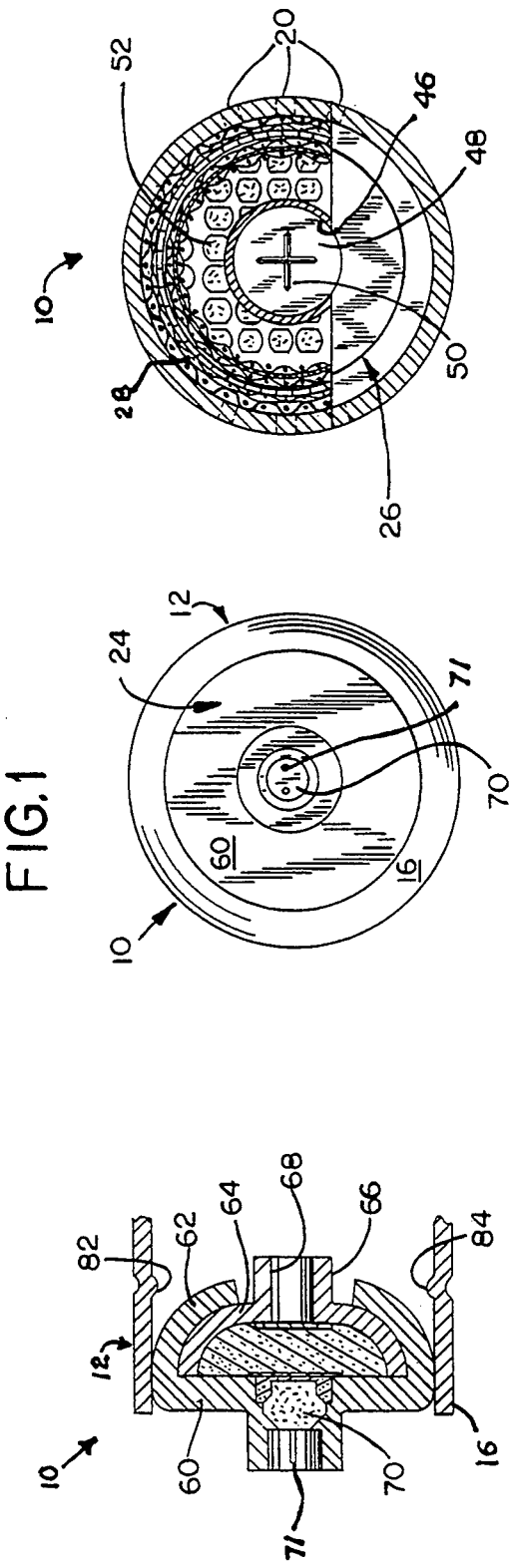

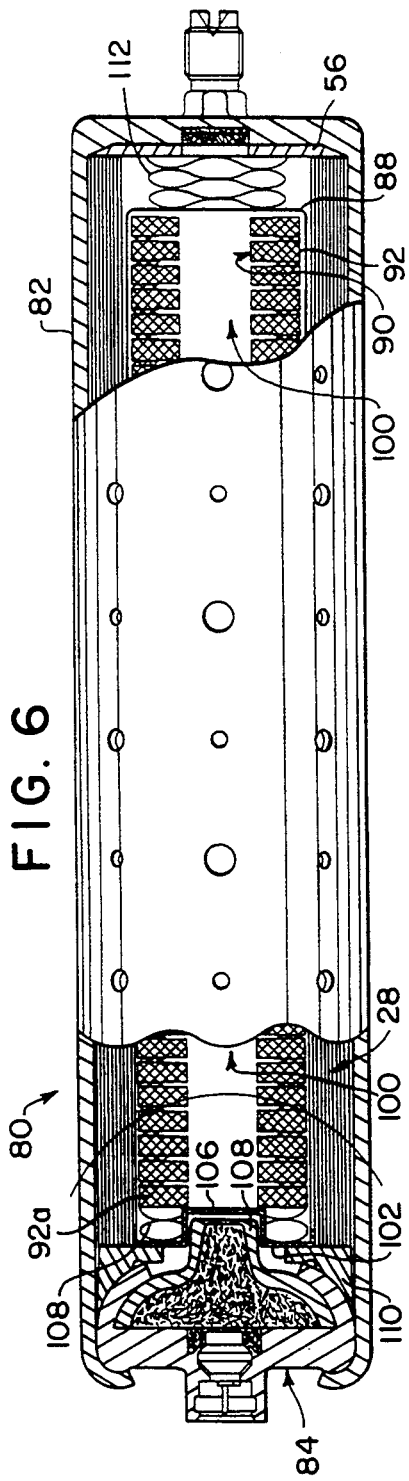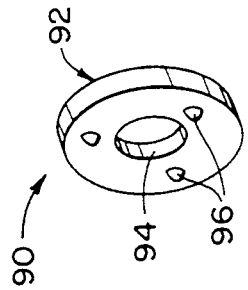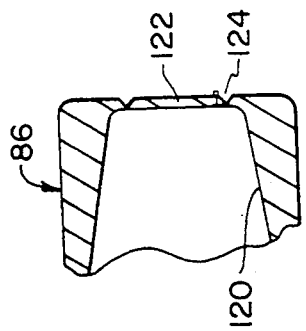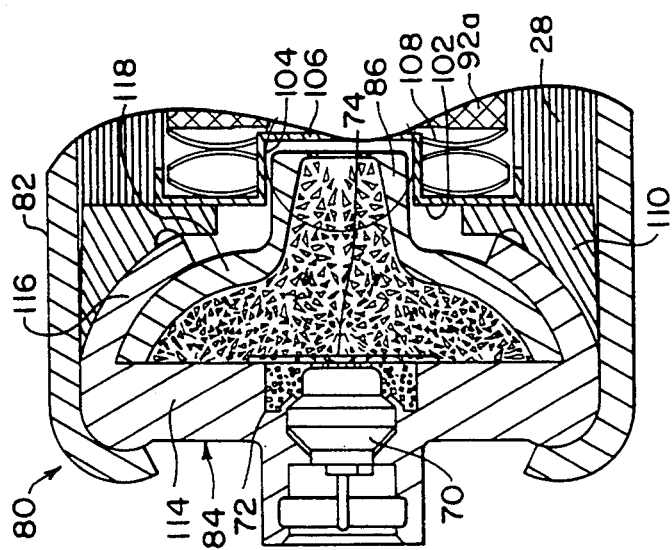

GAS GENERATOR FOR VEHICLE OCCUPANT RESTRAINT SYSTEM

This application is a continuation-in-part of application Ser. No. 07/958,934 filed Oct. 9, 1992 pending.

BACKGROUND OF THE INVENTION

1. Field of the Invention

This invention relates to gas generators, or inflators, using pyrotechnic gas generant for inflating air bags which are part of a vehicle occupant restraint system.

2. Description of Prior Art

Gas bags, which are more commonly referred to as air bags, are mounted within vehicles in positions to deploy in the event of a crash and to cushion an occupant from the effects of the crash. It is well known in the art to inflate air bags by gas generators using a combustible solid gas generant charge.

A typical gas generator for a passenger side air bag includes a cylindrical housing having openings therein for release of gas, a gas generant charge deployed along the interior length of the housing in pellet or wafer form, and a cooling and filtering structure surrounding the combustible gas generant charge in order to filter out hot or burning particles and cool the gas produced by the gas generant charge. Ignition of the gas generant charge is achieved by an igniter tube extending through the gas generant charge along the axis of the charge and the housing. The tube typically contains rapid detonation cord, or fuse, and igniter powder. An electric initiator and charge, or squib, is mounted at one end of the housing and lights the fuse. The fuse in turn sets off the igniter powder, which bursts the igniter tube and lights the gas generant charge.

Although it is a requirement that a gas generator produce gas very quickly so that the air bag deploys in time to provide occupant protection, there are also disadvantages in deploying the air bag too quickly. In particular, an overly rapid deployment of the air bag can injure an out-of-position occupant, especially a child. Thus, it is preferable that the initial deployment of the air bag be somewhat retarded, in order to avoid such an injury.

Most proposals for controlling the rate of initial gas generation have involved dividing the inflators into two stages. This is sometimes accomplished by dividing the single inflator housing into two chambers or compartments, each of which contain combustible gas generant material and providing a delay between ignition in the two chambers.

All of the foregoing has led to more complexity and cost in the manufacture of gas generators for air bags. As such gas generators are more widely used in vehicles, there is a need for more economical construction and ease of assembly, with due regard for controlled delivery of inflation gases to protect an out-of-position occupant.

SUMMARY OF THE INVENTION

An object of the invention herein is to provide an improved gas generator for vehicle occupant restraint systems which features simplicity and efficiency in the construction thereof that enables economic manufacture and assembly.

Another object of the invention is to provide an improved gas generator having an igniter capsule for mounting in the housing.

A further object of the invention is to provide an improved gas generator with a combustible gas generant provided in a sealed cartridge subassembly which facilitates shipping and handling of the gas generant prior to assembly of the generator and simplifies the assembly process itself.

An additional object of the invention is to provide an improved gas generator where the igniter and combustible gas generant are provided in separate, sealed subassemblies which are adjacently positioned in a housing and reliably cooperate to produce gas for inflating the air bag of a vehicle occupant restraint system.

Yet another object of the invention is to provide an improved gas generator for vehicle occupant restraint systems which has a single stage of combustible gas generant and provides controlled delivery of gas for inflating an air bag with due regard for the possibility of an out-of-position passenger.

A still further object of the invention is to provide an improved gas generator wherein an igniter and combustible gas generant are cooperative to achieve relatively uniform and even ignition of the gas generant.

In accomplishing these and other objects of the invention, there is provided a gas generator for vehicle occupant restraint systems which comprises an elongated housing having gas outlet openings formed along at least a portion of the length thereof, a pyrotechnic gas generant material contained within the housing, and an igniter capsule mounted to the housing. The igniter capsule has an outlet opening to the interior of the housing and juxtaposed the gas generant material therein, igniter material confined in the capsule, and an initiator for ignition of the igniter material. Operation of the initiator ignites the igniter material which burns rapidly and expels a fireball of hot products of combustion from the igniter capsule opening into contact with the pyrotechnic gas generant material, which is thereby ignited to produce gas for inflating the air bag of a vehicle occupant restraint system.

According to some aspects of the invention, the gas generant is provided in a cylindrical configuration with a central axial passage and the fireball is expelled into and along the central passage, thereby igniting the gas generant substantially evenly along the length of the housing. Further, the gas generant is provided in annular wafers having central openings, the wafers being stacked to achieve the cylindrical configuration of the gas generant and the central passage thereof.

According to certain aspects of the invention, a rupturable seal is provided over the outlet of the igniter capsule, and a nozzle extends from the outlet for directing the hot products of combustion toward the gas generant charge, and when the gas generant has a central passage, into that passage. Further features of the invention include providing an auto igniter for setting off the igniter material to operate the gas generator if it is exposed to fire, and positioning the auto igniter between the initiator and the igniter material whereby the auto igniter is also used as the initiator charge in the normal operation of the gas generator.

According to further aspects of the invention, the igniter capsule is formed of two overlapped metal parts, the igniter capsule is positioned at the open end of the elongated housing, and the end of the housing wall is rolled over the igniter capsule to mount and retain it.

According to additional aspects of the invention, the pyrotechnic gas generant charge is sealed in a rupturable cartridge. The gas generant cartridge is placed in the housing surrounded by filtering and cooling screens. One end of the gas generant cartridge is positioned adjacent the outlet of the igniter capsule and the gas generant cartridge has a scored or otherwise weakened entry wall which ruptures inwardly to admit the igniter fireball. When the gas generant is annular wafers, they are sealed in a generally cylindrical cartridge scored to admit the igniter fireball into the central passage defined by the gas generant.

According to other features of the invention, the gas generant cartridge is generally cylindrical and formed of a sheet of aluminum having a lapped, adhesively-sealed seam. End caps close the cartridge, and the end cap adjacent the igniter capsule has a scored or otherwise weakened portion for admitting the igniter fireball. The cartridge is alternately deep drawn with one end cap.

The gas generant charge is provided with a selected surface area to volume ratio to burn somewhat progressively and, in cooperation with the remaining structure of the gas generator, provide a delivery of gas for inflating the air bag of a vehicle occupant restraint system consistent with protecting an out-of-position passenger.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this summary of the invention, a detailed description follows with reference being made to the accompanying drawings which form a part of the specification, of which:

FIG. 1 is a side elevation view, partially in longitudinal section, of a gas generator for a vehicle occupant restraint system, according to the invention herein;

FIG. 2 is a longitudinal sectional view of the open end of the gas generator of FIG. 1, showing the housing and the igniter capsule thereof, during mounting of the igniter capsule;

FIG. 3 is an end view of the gas generator of FIG. 1;

FIG. 4 is a cross sectional view of the gas generator of FIG. 1, taken along the lines 4—4 of FIG. 1;

FIG. 6 is a side elevation view, partially in longitudinal section, of a gas generator for a vehicle occupant restraint system, employing an alternative configuration of gas generant material, according to the invention herein;

FIG. 7 is an enlarged sectional view of a portion of the gas generator of FIG. 6;

FIG. 8 is an enlarged view of the nozzle of the igniter capsule of the gas generator of FIG. 6; and FIG. 9 is a perspective view of a wafer of gas generant material used in the gas generator of FIG. 6.

The same reference numerals refer to the same elements throughout the various figures.

DESCRIPTION OF PREFERRED EMBODIMENT

Figure 5:
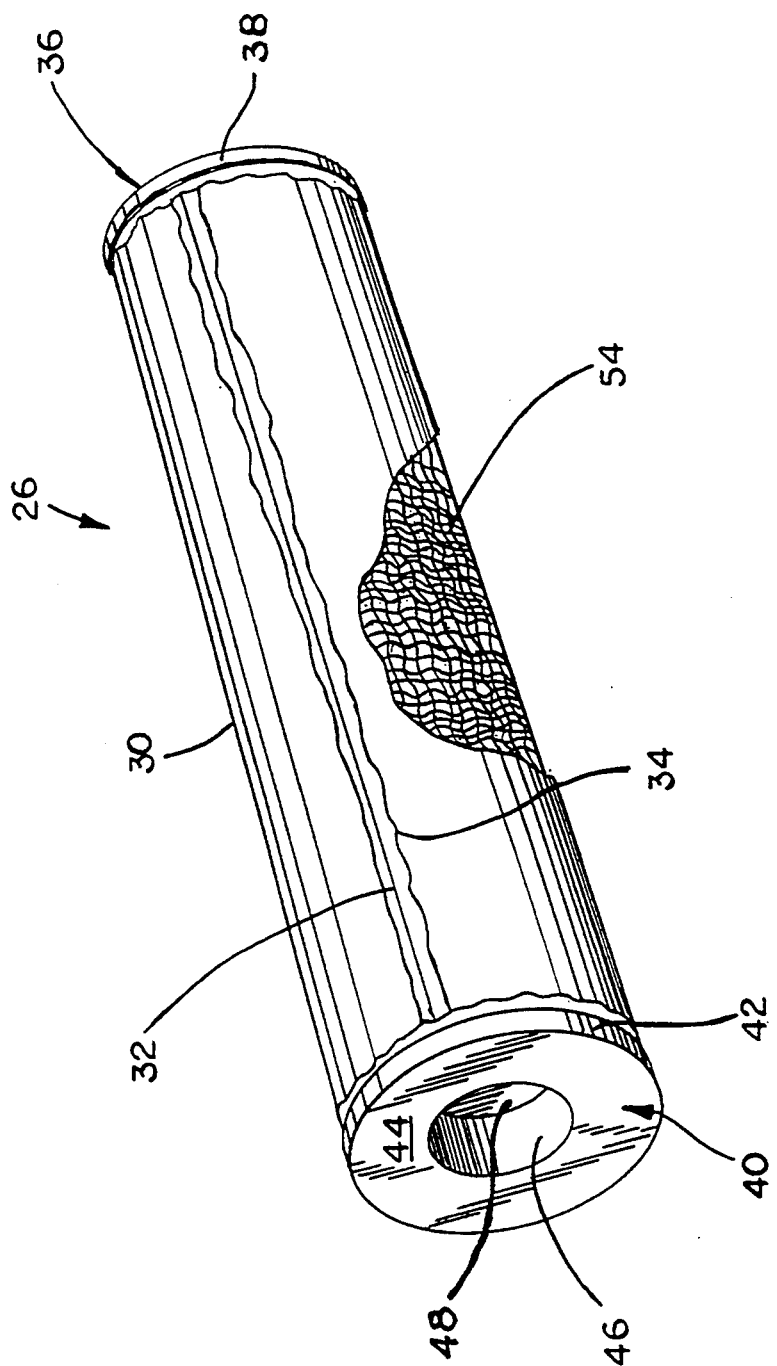
FIG. 5 is a perspective view, partially cut away, of the gas generant cartridge of the gas generator of FIG. 1.

With reference to the figures and especially FIG. 1, there is shown a gas generator 10 for inflating the air bag of a vehicle occupant restraint system. Although the gas generator 10 described herein is well adapted for inflating the air bag on the passenger side of the vehicle, the invention herein is applicable to inflating air bags in other locations as well.

The gas generator 10 includes a generally cylindrical housing 12 having a closed end 14 and an open end 16 with a tubular side wall portion 18 therebetween. The housing 12 is preferably fabricated of aluminum, with the closed end 14 integral with the elongated tubular side wall portion 18. The tubular side wall 18 defines a plurality of openings, generally indicated at 20, to permit the outflow of gas. The openings 20 are provided in a repetitious pattern along the side wall in diametrically opposed groups, in order that the outflow of gas does not produce uneven thrust which could cause the gas generator 10 to become a projectile. This "thrust neutral" deployment of openings is known in the art. The housing 12 further comprises a mounting stud 22 extending axially from the closed end wall 14, the stud being utilized to mount the gas generator 10 in its operable position in a vehicle restraint system.

An igniter capsule 24 is mounted in the open end 16 of the housing 12, as more fully described below, and the housing contains a gas generant cartridge 26 and a filter and cooling assembly 28, also described in more detail below.

With reference to FIG. 5, the gas generant cartridge 26 is shown in perspective view, partially cut away. The gas generant cartridge comprises a tubular side wall 30, which is preferably fabricated of a sheet of aluminum rolled into a tube with overlapping edges forming a seam at 32. The seam 32 is secured and sealed with hot melt adhesive, a portion of which is indicated at 34. The cartridge 26 has a first end cap 36 which comprises a circular end wall, not visible in FIG. 5, and a skirt 38 which overlaps the tubular side wall 30. The end cap 36 is also secured and sealed with hot melt adhesive. The side wall 30 and end cap 36 are fabricated of relatively thin aluminum sheet, on the order of 0.004 -0.006 inches. A second end cap 40 of the cartridge 26 is fabricated of thicker aluminum on the order of 0.030 inches, and also has a skirt 42 which is secured over and sealed the tubular side wall 30 with hot melt adhesive. The second end cap 40 is characterized by an end wall 44 having a central cylindrical recess 46 supporting an offset rupturable entry wall 48. As best seen in FIG. 4, the offset rupturable entry wall 48 has a scored cruciform 50 formed thereon, to a depth leaving a thickness on the order of 0.003 inches. Alternate shapes of scoring or weakening can be utilized, such as stamping the rupturable entry wall 48 to a thin, easily ruptured condition.

The cartridge 26 when assembled with pyrotechnic gas generant therein is totally sealed by the components thereof and the hot melt adhesive. The cartridge is filled with and contains pyrotechnic gas generant material comprising a plurality of pellets 52. The gas generant material may be one of any number of compositions meeting the requirements of burning rate, non-toxicity and flame temperature. One composition which is utilized in the preferred embodiment is that described in U.S. Pat. No. 4,203,787 to Schneiter et al., the disclosure of which patent is incorporated herein by reference. Particularly preferred are compositions comprising from about 65 percent by weight to about 70 percent by weight metal azide, up to about 4 percent by weight sulfur and from about 27 percent to about 33 percent by weight molybdenum disulfide, especially a composition comprising about 68 percent by weight sodium azide, about 2 percent by weight sulfur and about 30 percent by weight molybdenum disulfide.

In one preferred embodiment, the pellets are generally disc shaped, having a diameter of approximately 0.375 inches and a thickness of 0.142 inches. Although generally disc like, the pellets typically have a slightly curved, convex configuration. It will be appreciated that the gas generant material may also be provided in the form of circular wafers, as more fully described below.

The gas generant cartridge 26 further comprises a filter 54 in the form of two wraps of 30 mesh stainless steel screen which are deployed immediately adjacent and inside the tubular side wall 30. The screen provides a filter with respect to the gas generant and further provides structural rigidity and strength to the cartridge 26. Thus, the cartridge 26 may be fabricated with the screen 54 and pellets 52 therein, and sealed as a subassembly. The cartridge 26 may be handled, shipped, and stored prior to assembly into the gas generator 10 and the assembly itself is simplified by providing the gas generant in a shaped, easily handled unit.

The gas generant cartridge 26 is positioned in the housing 12, and is surrounded therein by the filter and cooling assembly 28. The filter and cooling assembly 28 is generally annular in cross section and, by way of example but not limitation, may include, beginning with the innermost layer next to the cartridge 26, two wraps of nickel-coated carbon or stainless steel 30 mesh screen, then plural wraps of a metal filter such as 80×700 or 50×250 mesh stainless steel or 40×180 mesh nickel-coated carbon, then a single wrap of ceramic filter paper 0.080 inches thick and two additional wraps of 30 mesh stainless or nickel-coated carbon. The filter and cooling assembly 28 extends along the entire length of the cartridge 26 and surrounds its tubular side wall 30. A rubber pad 56, capable of withstanding high temperature, is positioned on the inside of the closed end 14 of the housing 12, and the end of the filter and cooling assembly 28 butts against the rubber pad 56, as indicated at 58. The rubber pad 56 provides a sealing function with respect to the end of the filter and cooling assembly 28.

The igniter capsule 24 is positioned at the other end of the housing 12 and functions both to provide closure for the housing as well as ignite the combustible gas generant contained in the cartridge 26. The igniter capsule 24 comprises a base 60 having a integral skirt 62 extending from the periphery. Prior to assembling the igniter capsule 24, the skirt 62 is tubular. A cap 64 of generally hemispherical configuration is received against the periphery of base 60 adjacent and inside the skirt 62, and the skirt 62 is roll crimped onto the cap in order to assemble the base 60 and cap 64 together, as they are shown in the drawings. The cap 64 further defines a nozzle 66 extending from outlet opening 68 from the interior of the igniter capsule 24.

The base 60 of the igniter capsule defines an opening receiving and mounting an initiator 70. Initiators are well-known in the art, also by the term "squib", and provide ignition upon receipt of an electric pulse upon terminals 71. A full-up electric squib normally contains a small explosive charge, but in the gas generator 10 described herein a charge of auto ignition material 72 is positioned adjacent the electrical portion of the squib and provides the explosive charge upon electrical pulse operation of the initiator. A foil thin seal 74 is placed across the opening in which the initiator 70 and auto ignition powder 72 are mounted.

An aluminum disk seal 76 is secured across the outlet 68 from the igniter capsule 24, thereby providing a sealed interior chamber. This disk 76 is on the order of 0.004–0.006 inches thick. This chamber is filled with igniter material 78, which may be any of a variety of compositions meeting the requirements for rapid ignition and non-toxicity. A preferred material for this use is a granular mixture of 25 percent by weight of boron and 75 percent by weight of potassium nitrate ($BKNO_3$). Foil disk 76 provides pressure control at the outlet for proper ignition of the igniter granules.

The manufacturing sequence for the igniter capsule 24 is to first form the base 60 and skirt 62, and to mount the initiator 70, auto ignition charge 72 and foil seal 74 therein. The igniter cap 64 is separately formed and the aluminum disc 76 secured to close off the nozzle outlet opening 68. The igniter cap 64 is then loaded with the igniter granules 78 and the cap joined to the base by roller crimping the skirt 62 over the peripheral exterior of the cap.

After the pad 56, filter and cooling assembly 28 and gas generant cartridge 26 have been inserted into the housing 12, the igniter capsule 24 is then mounted to the housing 12, to complete assembly of the gas generator 10. With particular reference to FIG. 2, the tubular side wall 18 of the housing is dimpled inwardly along a circumference thereof, producing raised nubs 82 and 84 extending inwardly from the housing wall. The capsule 24 is inserted into the housing wall 18 until it rests against the nubs 82 and 84, in the position shown in FIG. 1. Four such nubs are preferably provided for this purpose, arrayed at 90 degree intervals about the housing wall. The open end 16 of the housing wall is then roller crimped over the peripheral portion of base 60 of the igniter capsule 24, as best seen in FIGS. 1 and 3.

Upon assembly of the igniter capsule 24 into the housing 12, the nozzle 66 of the igniter capsule extends into the recess 46 of the gas generant cartridge 26, and the outlet of the nozzle is juxtaposed the offset entry wall 48 on which the cruciform 50 is formed.

The gas generator 10 is mounted in a vehicle and a air bag is also mounted in connection therewith, the air bag being positioned and adapted to receive gas from the generator 10. In the operation of the gas generator 10, an electrical impulse from a crash sensor (not shown) fires the initiator 70. This sets off the auto ignition powder 72 in an explosive manner, rupturing the foil seal 74 and lighting the igniter powder 78. The seal 76 contains the igniter powder during initial burning thereof, which promotes uniform ignition and pressure build-up in the igniter capsule 24. Upon attaining a sufficient pressure build-up, the seal 76 ruptures and a fire ball of hot gasses is expelled through the opening 68 in nozzle 66.

The igniter fire ball has sufficient pressure to rupture the generant cartridge 26 at the cruciform 50 in the offset entry wall 48, permitting the fire ball to flow into the load of gas generant pellets 52. The gas generant pellets 52 ignite substantially simultaneously, and the pressure of the resulting combustion gasses builds up within the cartridge 26 until the aluminum side wall 30 thereof ruptures. The gasses then flow through the filtering and cooling assembly 28 and exit the openings 20 in the housing 12. The combustion of the gas generant pellets 52 is of sufficiently high temperature and vigor that the aluminum walls of the cartridge 26 are substantially consumed, with the residue being trapped in the filter and cooling assembly 28. The filter and cooling assembly also traps residue from the gas generant pellets themselves, as well as restrains any burning pieces thereof carried outwardly by the gas flow.

With reference to FIG. 6, another gas generator 80 according to the invention is illustrated. Gas generator 80 is characterized by the gas generant material being provided in a cylindrical configuration defining a central passage. The gas generator 80 is otherwise similar to gas generator 10 described above, i.e. the gas generator 80 includes an elongated cylindrical housing 82, an igniter capsule 84 closing one end thereof and defining an outlet nozzle 86 directed along the central axis of the housing 82, a generally cylindrical gas generant cartridge 88 received within the elongated cylindrical housing 82 and containing the gas generant 90 in the configuration of this embodiment and a filter and cooling assembly 28 (shown schematically) surrounding the cartridge 88.

More particularly, the gas generant 90 is conveniently provided in a plurality of wafers 92, one of which is shown in perspective in FIG. 9. Each wafer 92 is annular, having a central opening 94. The central opening has a diameter equal to or preferably slightly larger than the outlet opening of nozzle 86 of igniter capsule 84. On the planner sidewalls of the wafers 92 are raised spacers 96, which maintain space between the wafers when they are stacked in the cartridge 88. In a specific embodiment, the wafers may have an outside diameter of 1.44" (3.56 cm), a central opening of $\frac{1}{2}$" (1.27 cm), and spacers having a height of 0.5" (0.4 cm). The central openings 94 are also aligned when the wafers 92 are stacked in the cartridge 26, thereby providing the central passage 100 in the gas generant material.

The gas generant 90 is received in elongated cartridge 88, the sidewalls and distal end of which are deep-drawn aluminum. An entry end cap 102 of thicker aluminum closes the cartridge adjacent the igniter capsule 84, and end cap 102 includes a recess 104 and offset entry wall 106 juxtaposed nozzle 86. The entry wall 106 is weakened, such as by cruciform scoring, as described above.

Also enclosed within cartridge 88 is a spring 108, positioned between the end cap 102 and the first gas generant wafer 92a. The spring 108 biases the wafers together and against the distal end of the cartridge, so that the wafers are not free to impact against each other and thereby chip or fracture. The gas generant is further protected by a seal pad 110 positioned between the igniter capsule 84 and the end cap 102 of cartridge 88, and spring 112 at the opposite end of the housing 82, which biases the cartridge against pad 110 and prevents unrestrained movement within the housing.

The filter and cooling assembly 28 is shown schematically in FIGS. 6 and 7, and is positioned between the seal pad 110 and end pad 56 at the opposite end of housing 82.

The capsule 84 includes a base 114 having a skirt 116 formed over cap 118, and is mounted in the end of housing 82, all similar to capsule 24 described above. An initiator 70 and auto ignition powder 72 are located in base 114, under seal 74. The cap 118 includes nozzle 86, which extends into the recess 104 in cartridge end cap 102. The nozzle 86, on its interior operative surface 120, tapers toward the outlet end, which is covered by an integral, break-away end wall 122, best seen in FIG. 8. The end wall 122 is defined by circular scoring 124, providing the breakaway function.

In the operation of the gas generator 80, the igniter capsule produces a fireball of hot gases which break away end wall 122 and are expelled through the tapered opening 120 in nozzle 66. The igniter fireball has sufficient pressure to rupture the gas generant cartridge at the end entry wall 106, permitting the fireball to flow into the central passage 100 in the gas generant material 90. The fireball travels freely through the passage 100, igniting all of the wafers 92 substantially simultaneously. The spacers 96 of the wafers maintain clearance between the wafers, wherein initial travel of gas radially outwardly is permissible, both for initial production of the gas and for further ignition of the wafers.

The seal pads 56 and 102 prevent the igniter fireball from exiting the cartridge through the filter and cooling assembly 28.

In both embodiments 10 and 90 of gas generators, because the walls of the gas generant cartridge closely surround the gas generant pellets 52 or wafers 92, the pressure build-up in the cartridge occurs quite quickly and the rupture of the cartridge walls occurs soon after ignition of the gas generant. However the volume of gas in the cartridge is relatively small, e.g., compared with prior art inflators in which a rupturable foil seal is wrapped about the exterior of the housing. This causes inflation of the air bag to begin promptly, but to proceed more slowly during the initial phases, contributing to protecting an out-of-position passenger against too rapid deployment of the air bag.

Other features of the inflators 10 and 80 which also contribute to such protection for the out-of-position passenger are the selection of the size of the gas generant pellets or wafers; namely, using relatively large pellets or wafers having a greater volume to surface area relationship, so that burning of the entire volume of the gas generant proceeds more slowly. The pellet and wafer sizes specified above have proven useful in providing an inflator for a passenger side air bag, but the pellet and wafer size is a function of volume and configuration of the air bag as well so that no particular size can be considered preferred for all restraint systems. Also contributing to protection for the out-of-position passenger is the density of the filter and cooling pack 28, which retards the surge of initial pressure.

A further aspect of the operation of the inflators 10 and 80 occurs when they are subject to extreme heat condition, such as in a fire. In such condition, when the ambient temperature reaches approximately 350° Fahrenheit, the auto ignition charge 72 self-ignites, setting off the igniter powder and consequently the gas generant. In that temperature range, the aluminum housings 12 and 82 retain their structural integrity, and the gas generator 10 produces gasses through its openings 20. Without benefit of the auto ignition powder, the igniter powder and/or gas generant would self-ignite at temperatures exceeding 600° F., at which the aluminum would not have structural integrity whereby the housing could blow apart in fragments.

Accordingly, preferred embodiments of gas generators have been described which° admirably achieve the objects of the invention herein. With reference to the description of the preferred embodiments, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims and equivalents thereof.

We claim:

1. A gas generator for a vehicle occupant restraint system, comprising:
   an elongated cylindrical housing having a length at least two times greater than its diameter and having gas outlet openings formed therethrough;
   a pyrotechnic gas generant material contained within the housing, the gas generant material defining a single open elongated central passage therein;
   an igniter capsule containing substantially all of the igniter material for igniting the pyrotechnic gas generant and having means for igniting the igniter material, the igniter capsule positioned adjacent the pyrotechnic gas generant material and defining a single exit opening adjacent the .open central passage formed in the gas generant material, the exit opening being of substantially the same diameter or smaller than the open central passage formed in the gas generant material;
   whereby ignition and burning of the igniter material causes an expulsion of hot igniter material, combustion products from the igniter capsule into and along the length of the open central passage in the gas generant material, thereby igniting the gas generant material along the length of the open central passage.

2. A gas generator for a vehicle occupant restraint system, comprising:
   a housing having gas outlet openings formed therethrough;
   a pyrotechnic gas generant material contained within the housing, the gas generant material defining an elongated central passage therein;
   an igniter capsule containing igniter material and having means for igniting the igniter material, the igniter capsule positioned adjacent the pyrotechnic gas generant material and defining an exit opening adjacent the central passage formed in the gas generant material, the exit opening defined by the igniter capsule comprising a nozzle extending therefrom and directing hot combustion products from the igniter capsule into the central passage in the gas generant material;
   whereby ignition and burning of the igniter material causes an expulsion of hot combustion products from the igniter capsule into the central passage in the gas generant material, thereby igniting the gas generant material along the length of the central passage.

3. A gas generator as defined in claim 2 and further comprising a rupturable seal positioned on one of the exit opening of the igniter capsule or the nozzle, which seal ruptures upon burning of the igniter material and consequent build up of pressure in the igniter capsule, thereby permitting the expulsion of hot combustion products from the igniter capsule into the central passage of the gas generant material.

4. A gas generator as defined in claim 3 wherein the seal is an integral, break-away end wall of the nozzle.

5. A gas generator as defined in claim 2 wherein the nozzle and the central passage in the gas generant material are aligned.

6. A gas generator as defined in claim 5 wherein the gas generant is provided in a plurality of annular wafers having aligned central openings defining the central passage.

7. A gas generator as defined in claim 6 wherein the wafers are longitudinally spaced apart.

8. A gas generator as defined in claim 7 and further comprising a sealed cartridge containing the gas generant material, the sealed cartridge having a rupturable entry opening juxtaposed the nozzle outlet of the igniter capsule and covering the central passage in the gas generant material.

9. A gas generator as defined in claim 8 wherein the rupturable entry portion of the cartridge wall includes a recess offsetting the rupturable entry portion inwardly and the nozzle extends into the recess.

10. A gas generator as defined in claim 2 wherein the gas generant is provided in a plurality of annular wafers having aligned central openings defining the central passage.

11. A gas generator as defined in claim 10 wherein the wafers are incrementally longitudinally spaced apart by spacers integral with the wafers.

12. A gas generator as defined in claim 11 and further comprising a sealed cartridge containing the gas generant material, the sealed cartridge having a rupturable entry opening juxtaposed the exit opening of the igniter capsule and covering the central passage in the gas generant material.

13. A gas generator as defined in claim 12 wherein the rupturable entry portion of the cartridge wall includes a recess offsetting the rupturable entry portion inwardly, and the exit opening of the igniter capsule comprises a nozzle received in the offset recess.

14. A gas generator as defined in claim 2 wherein the means for igniting the igniter material is an initiator charge comprised of auto ignition material for igniting in fire conditions below the temperature at which the housing loses structural integrity.

15. A gas generator for a vehicle occupant restraint system, comprising:
   an elongated housing having gas outlet openings defined therethrough, the housing having a tubular side wall, a first end and end wall, and a second end;
   pyrotechnic gas generant material contained within the housing and extending from adjacent the first end and end wall toward the second end, the gas generant material including a plurality of annular wafers with aligned central openings defining an elongated central passage aligned with the axis of the elongated housing;
   an igniter capsule including a base and cap secured together and containing igniter material therein, the base of the capsule forming a portion of the closure of the second end wall of the elongated housing, the base including a skirt extending from the periphery thereof, the cap having a generally hemispherical configuration and being placed against the periphery of the base within the skirt, and the skirt roll crimped over the cap, the cap defining an exit opening from the igniter cartridge and further including a nozzle extending from the exit opening toward the central opening in the wafers of pyrotechnic gas generant material, the igniter capsule having an initiator and associated initiator charge directed toward the igniter material;
   whereby, when operated, the initiator sets off the initiator charge and resultingly the igniter material, and the igniter material thereafter causes an expulsion of hot combustion products from the igniter capsule into the central passage of pyrotechnic gas generant material for igniting it along the length of the central passage.

16. A gas generator as defined in claim 15 wherein the exit opening is covered by a rupturable seal, which ruptures to release hot combustion products from the igniter capsule.

17. A gas generator as defined in claim 15 wherein the nozzle includes an integral break-away end wall which breaks away to release hot combustion products from the igniter capsule.

18. A gas generator as defined in claim 15 wherein the elongated housing has inwardly projecting nubs spaced from the second end thereof, the capsule is mounted in the second end of the housing in engagement with the numbs, and the second end of the housing wall is roll crimped inwardly to secure the capsule with the housing.

19. A gas generator for a vehicle occupant restraint system, comprising:
an elongated housing having gas outlet openings defined therethrough, the housing having a tubular side wall, a first end and end wall, and a second end;
pyrotechnic gas generant adjacent contained within the housing and extending from adjacent the first end and end wall toward the second end, the gas generant material including a plurality of annular wafers with aligned central openings defining an elongated central passage aligned with the axis of the elongated housing;
an igniter capsule mounted at the second end of the housing, the igniter capsule including a base and a cap secured together and containing igniter material therein, the base of the capsule forming at least a portion of a second end wall of the elongated housing, the igniter capsule having an initiator and associated initiator charge directed toward the igniter material and the igniter capsule defining an outlet opening juxtaposed the central opening in the wafers of pyrotechnic gas generant material contained within the housing, and including a nozzle extending from the exit opening toward the central opening of the pyrotechnic gas generant material, the nozzle including an integral break-away end wall which breaks away to release hot combustion products from the igniter capsule, whereby, when operated, the initiator sets off the initiator charge and resultingly the igniter material, and the igniter material thereafter causes an expulsion of hot combustion products from the igniter capsule into the central passage of pyrotechnic gas generant material for igniting it along the length of the central passage.

20. A gas generator as defined in claim 19 wherein the capsule is positioned within the tubular side wall of the housing near the second end thereof, and the housing wall adjacent the second end is formed inwardly over the capsule to close the housing and secure the capsule therein.

21. A gas generator as defined in claim 20 wherein the capsule is axially positioned within the tubular housing by engagement with inwardly projecting nubs formed thereon.

22. A gas generator as defined in claim 20 wherein the initiator is an electrically operable initiator mounted in an opening in the base of the capsule, the initiator having terminals exposed on the exterior of the housing and capsule.

23. A gas generator as defined in claim 22 wherein the initiator charge is auto ignition material for igniting the igniting material in fire conditions below the temperature at which the housing loses its structural integrity.

24. A gas generator as defined in claim 15 and further comprising a sealed cartridge containing the pyrotechnic gas generant material.

25. A gas generator as defined in claim 24 and further comprising a filter and cooling means positioned between the sealed cartridge and the gas outlet openings of the housing.

26. A gas generator for a vehicle occupant restraint system, comprising:
an elongated cylindrical housing having a length at least two times greater than its diameter and having gas outlet openings formed therethrough, the housing having a tubular side wall, a first end and end wall, and a second end;
pyrotechnic gas generant material contained within the housing and extending from adjacent the first end and end wall toward the second end, the gas generant material including a plurality of annular wafers with aligned central openings defining an elongated open central passage aligned with the axis of the elongated housing;
an igniter capsule mounted at the second end of the housing and containing substantially all the igniter material for igniting the pyrotechnic gas generant material, the igniter capsule having an initiator and associated initiator charge directed toward the igniter material and the igniter capsule defining an outlet opening including a nozzle juxtaposed the central opening in the wafers of pyrotechnic gas generant material contained within the housing;
a sealed cartridge containing the pyrotechnic gas generant material, the sealed cartridge having an end wall adjacent the outlet of the nozzle extending from the igniter capsule and covering the central opening of the pyrotechnic gas generant material, and the cartridge end wall having a rupturable entry portion against which the nozzle directs hot combustion products from the igniter capsule,
whereby, when operated, the initiator sets off the initiator charge and resultingly the igniter material, and the igniter material thereafter causes an expulsion of hot combustion products from the igniter capsule through the rupturable entry portion of the sealed cartridge into the open central passage of pyrotechnic gas generant material for igniting it along the length of the central passage.

27. A gas generator as defined in claim 26 wherein the rupturable entry portion of the cartridge wall includes a recess offsetting the rupturable entry portion inwardly, and the nozzle is received in the offset recess.

28. A gas generator as defined in claim 27 and further comprising a filter and cooling means positioned between the sealed cartridge and the gas outlet openings of the housing.

29. A gas generator for a vehicle occupant restraint system, comprising:
an elongated cylindrical housing having a length at least two times its diameter and having gas outlet openings defined therein;
an elongated sealed cylindrical cartridge containing a plurality of wafers of pyrotechnic gas generant material, the wafers having aligned central openings forming an open central passage, the cartridge having a tubular side wall rupturable to release gas produced by the pyrotechnic gas generant material, when ignited, the cartridge further having end walls with at least one of the end walls including a rupturable entry portion adjacent the central passage defined through the wafers of gas generant material, the sealed gas generant cartridge being received within the elongated cylindrical housing and extending substantially its entire length; and an igniter charge deployed outside and adjacent the rupturable entry end wall portion of the sealed gas generant cartridge juxtaposed the central passage in the gas generant wafers, the igniter charge being substantially all igniter material for the gas generant and means for igniting the igniter charge;

whereby, when ignited, the igniter charge produces hot combustion products which rupture the entry portion of the cartridge end wall, and enter the open central passage of the wafers of pyrotechnic gas generant material therein to ignite them.

30. A gas generator as defined in claim 29 and further comprising a filter and cooling means positioned between the sealed cartridge and the gas outlet openings of the housing.

31. A gas generator as defined in claim 30 wherein the sealed gas generant cartridge is formed of metal, and wherein the end wall on which the rupturable entry portion is formed is thicker than the tubular side wall.

32. A gas generator as defined in claim 31 wherein the rupturable entry portion of the end wall comprises scoring.

33. A gas generator as defined in claim 32 wherein the scoring is in the configuration of a cruciform.

34. A gas generator as defined in claim 32 wherein the tubular side wall of the gas generant cartridge comprises a roll sheet of aluminum having an overlapped sealed seam, and the end walls of the gas generant cartridge are end caps having skirts which fit over the tubular side wall and are sealed thereto.

35. A gas generator as defined in claim 32 wherein the tubular side wall and one end wall of the gas generant cartridge are deep-drawn aluminum, and the other applied to the end is an end cap including the scoring.

36. A gas generator as defined in claim 35 wherein the sealed gas generator cartridge includes at least one wrap of filter screen deployed inside and adjacent to the tubular side wall, the filter screen providing additional rigidity to the sealed gas generant cartridge.

37. A gas generator as defined in claim 29 wherein the sealed gas generator cartridge includes at least one wrap of filter screen deployed inside and adjacent to the tubular side wall, the filter screen providing additional rigidity to the sealed gas generant cartridge.

38. A gas generator as defined in claim 37 wherein the sealed gas generant cartridge is formed in metal, the end wall on which the rupturable entry portion is formed is thicker than the tubular side wall, and the rupturable entry portion is a weakened portion of the end wall.

39. A gas generator as defined in claim 38 wherein the rupturable entry portion of the end wall comprises scoring.

40. A gas generator for a vehicle occupant restraint system, comprising:

an elongated cylindrical housing having a tubular side wall, a first end and end wall and a second end;

a plurality of gas outlet opening defined in the tubular wall of the cylindrical housing, the gas outlet openings being deployed in diametrically opposed groups;

a tubular filter and cooling assembly received in the housing extending from the first end wall and positioned adjacent the tubular side wall, the tubular filter and cooling assembly having plural layers of filter material including screening;

a cylindrical sealed gas generant cartridge received in the housing within the tubular filter and cooling assembly, the gas generant cartridge having a rupturable tubular side wall and a end cap stronger than the tubular sidewall, the end cap having a weakened rupturable entry wall portion facing the second end of the housing;

a pyrotechnic gas generant material contained within the cartridge, the gas generant material including a plurality of wafers of gas generant having aligned openings forming a central passage, one end of which is adjacent the rupturable entry wall portion of the cartridge;

an igniter capsule including a base mounted at and closing the second end of the housing;

the igniter capsule base defining an opening receiving and mounting an electrically operable initiator with terminals thereof exposed on the exterior of the housing;

an initiator charge mounted adjacent the initiator for ignition thereby;

igniter powder contained within the igniter capsule adjacent the initiator charge for ignition thereby;

the initiator capsule further including a cap cooperating with the base to contain the igniter material, the cap having a rupturably sealed exit opening defined by a nozzle directed at the rupturable entry wall portion of the gas generant cartridge and the central passage of the gas generant material therein.

41. A gas generator as defined in claim 1 and further comprising a sealed cylindrical cartridge containing the gas generant material.

42. A gas generator as defined in claim 41 wherein the sealed cylindrical cartridge has an end wall adjacent the igniter capsule, the end wall having a weakened rupturable entry portion positioned between the exit opening of the igniter capsule and the single elongated central passage of the gas generant material.

* * * * *

UNITED STATES PATENT AND TRADEMARK OFFICE
CERTIFICATE OF CORRECTION

PATENT NO. : 5,443,286
DATED : August 22, 1995
INVENTOR(S) : Cunningham et al.

It is certified that error appears in the above-indentified patent and that said Letters Patent is hereby corrected as shown below:

Col. 8, Ln. 61    after "which" delete " ° ".

Col. 11, Ln. 16    change "numbs" to read -- nubs --.

Col. 11, Ln. 25    change "adjacent" to read -- material --.

Signed and Sealed this

Eighteenth Day of June, 1996

Attest:

BRUCE LEHMAN

Attesting Officer    Commissioner of Patents and Trademarks